United States Patent
Funke et al.

(10) Patent No.: US 9,110,468 B2
(45) Date of Patent: Aug. 18, 2015

(54) UNIVERSAL REMOTE OPERATOR STATION

(71) Applicant: Caterpillar Inc., Peoria, IL (US)

(72) Inventors: Brian G. Funke, Peoria, IL (US); Seth J. Redenbo, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 134 days.

(21) Appl. No.: 13/755,124

(22) Filed: Jan. 31, 2013

(65) Prior Publication Data

US 2014/0214240 A1  Jul. 31, 2014

(51) Int. Cl.
  *G05D 1/00* (2006.01)
  *G05D 1/02* (2006.01)
  *G07C 3/00* (2006.01)

(52) U.S. Cl.
  CPC ............ *G05D 1/0016* (2013.01); *G05D 1/0011* (2013.01); *G05D 1/0027* (2013.01); *G05D 1/0291* (2013.01); *G07C 3/00* (2013.01); *G05D 2201/0202* (2013.01)

(58) Field of Classification Search
  CPC .............. G05D 1/0011; G05D 1/0038; G05D 2201/0201; G05D 2201/0202
  USPC ............................................................ 701/2
  See application file for complete search history.

(56) References Cited

U.S. PATENT DOCUMENTS

| | | | |
|---|---|---|---|
| 4,986,384 A * | 1/1991 | Okamoto et al. | 701/2 |
| 6,061,617 A * | 5/2000 | Berger et al. | 701/50 |
| 6,211,856 B1 * | 4/2001 | Choi et al. | 345/666 |
| 6,238,265 B1 | 5/2001 | Crane et al. | |
| 6,633,800 B1 * | 10/2003 | Ward et al. | 701/2 |
| 2002/0022909 A1 | 2/2002 | Karem | |
| 2005/0060066 A1 | 3/2005 | Buehler et al. | |
| 2008/0231708 A1 * | 9/2008 | Morimoto et al. | 348/159 |
| 2012/0068857 A1 | 3/2012 | Rothkopf et al. | |
| 2012/0089291 A1 * | 4/2012 | Halder et al. | 701/23 |
| 2012/0136507 A1 | 5/2012 | Everett et al. | |
| 2012/0197465 A1 * | 8/2012 | Gotou et al. | 701/2 |

* cited by examiner

*Primary Examiner* — Helal A Algahaim
*Assistant Examiner* — Donald J Wallace
(74) *Attorney, Agent, or Firm* — Finnegan, Henderson, Farabow, Garrett & Dunner, LLP

(57) ABSTRACT

A remote operator station for controlling an operation of a machine is disclosed. The remote operator station comprises a display device, a plurality of control devices, and a controller communicably coupled to the display device and the control devices. The controller is configured to display a list of types of machines capable of being operated remotely. The controller receives an input indicative of a machine selected from the list. The controller determines a plurality of functionalities associated with the operation of the selected machine. The controller maps the determined functionalities to the plurality of control devices and further displays the mapped functionalities associated with the control devices.

20 Claims, 8 Drawing Sheets

UNIVERSAL REMOTE OPERATOR STATION

TECHNICAL FIELD

The present disclosure relates to a remote operator station for a machine. In a specific embodiment, the present disclosure relates to a universal remote operator station, and more particularly relates to the universal remote operator station for controlling various types of machines within a worksite.

BACKGROUND

Some machines are capable of being operated in a remote control mode or an autonomous mode. An operator may control these machines from an operator station located at a remote location. However, there are different remote operator stations for different types of machines. For example, the remote operator station may be configured to have controls specific to a single type of machine, such as, for example, a motor grader, a dozer, and the like. This approach proves to be expensive since the remote operator station provides support only for a single type of machine.

United States Publication Number 2005/0060066 describes a device that connects a mother vehicle to a child vehicle. The mother vehicle then controls the operation of the child vehicle. The mother vehicle may be switched from a driving mode to a remote controller mode for the child vehicle. The known solution discloses the mother vehicle which can be used to operate a unique child vehicle.

Therefore, there is a need for an improved remote operator station which provides a cost effective solution.

SUMMARY OF THE DISCLOSURE

In one aspect of the present disclosure, a remote operator station for controlling an operation of a machine is provided. The remote operator station comprises a display device, a plurality of control devices, and a controller communicably coupled to the display device and the control devices. The controller is configured to display a list of types of machines capable of being operated remotely. The controller further receives an input indicative of a machine selected from the list. The controller determines a plurality of functionalities associated with the operation of the selected machine. The controller maps the determined functionalities to the plurality of control devices and further displays the mapped functionalities associated with the control devices.

In another aspect, a method for controlling an operation of a machine from a remote operator station. The method displays a list of types of machines capable of being operated remotely. The method further receives an input indicative of a machine selected from the list. The method determines a plurality of functionalities associated with the operation of the selected machine. The method maps the determined functionalities to a plurality of control devices in the remote operator station. Further, the method displays the mapped functionalities associated with the plurality of control devices.

In a yet another aspect, a system is provided. The system comprises one or more machines capable of operation in at least one of a remote control or an autonomous mode. The machines belong to a type of a machine. The system further includes a remote operator station in communication with the one or more machines. The remote operator is configured to control an operation of the machines. The remote operator station comprises a display device, a plurality of control devices, and a controller communicably coupled to the display device and the control devices. The controller is configured to display a list of types of machines capable of being operated remotely. The controller further receives an input indicative of a machine selected from the list. The controller determines a plurality of functionalities associated with the operation of the selected machine. The controller maps the determined functionalities to the plurality of control devices and further displays the mapped functionalities associated with the control devices.

Other features and aspects of this disclosure will be apparent from the following description and the accompanying drawings.

DETAILED DESCRIPTION

Figure 1:
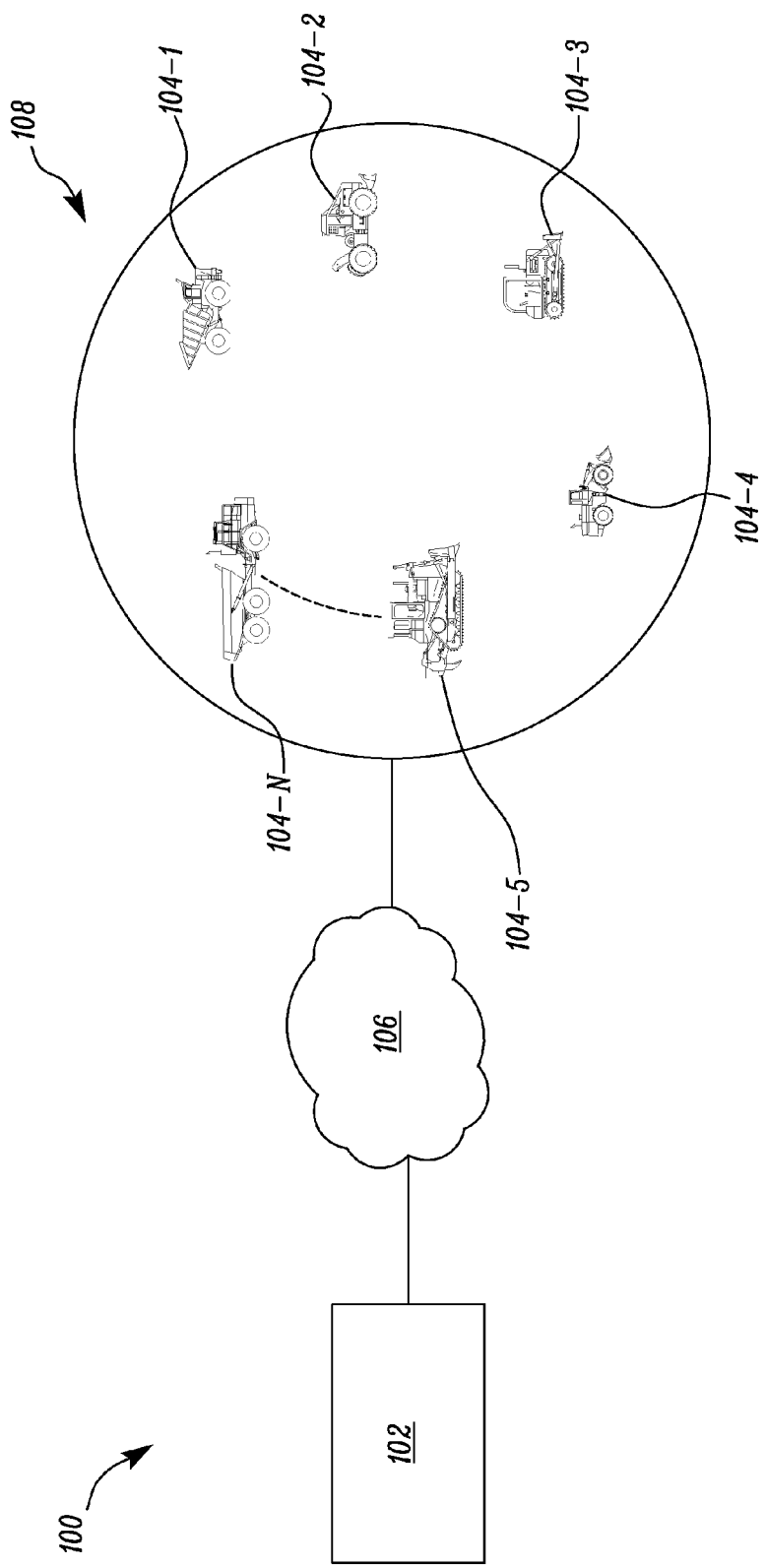
FIG. 1 is an overview of an exemplary environment having a universal remote operator station and a plurality of types of machines operating on a worksite, according to an embodiment of the present disclosure.

The detailed description of exemplary embodiments in the disclosure herein makes reference to the accompanying drawings and figures, which show the exemplary embodiments by way of illustration only. While these exemplary embodiments are described in sufficient detail to enable those skilled in the art to practice the disclosure, it should be understood that other embodiments may be realized and that logical and mechanical changes may be made without departing from the spirit and scope of the disclosure. It will be apparent to a person skilled in the pertinent art that this system can also be employed in a variety of other applications. Thus, the detailed description herein is presented for purposes of illustration only and not of limitation. For example, the steps recited in any of the method or process descriptions may be executed in any order and are not limited to the order presented.

The present disclosure is described herein with reference to block diagrams and flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, prompts, etc. Practitioners will appreciate that the illustrated steps described herein may comprise in any number of configurations including the use of windows, hypertexts, hyperlinks, popup windows, prompts and the like. It should be further appreciated that the multiple steps as illustrated and described may be combined into single windows but have been expanded for the sake of simplicity. In other cases, steps illustrated and described as single process steps may be separated into multiple windows but have been combined for simplicity.

FIG. 1 illustrates an exemplary environment 100 for implementing a universal remote operator station 102. The environment 100 includes the universal remote operator station 102, a number of machines 104-1, 104-2 . . . 104-*n*, collectively referred to as machines 104, and a communication network 106. The universal remote operator station 102 and the machines 104 may communicate with each other via the communication network 106. In one embodiment, the universal remote operator station 102 is configured to remote control any of the machines 104 within a worksite 108.

Examples of the communication network 106 may include a wide area communication network (WAN), a local area communication network (LAN), an Ethernet, Internet, an Intranet, a cellular communication network, a satellite communication network, or any other suitable communication network for transmitting data. The communication network 106 may be implemented as a wired communication network, a wireless communication network or a combination thereof.

In one embodiment, the machines 104 may be working at the worksite 108, such as a mine site. The machines 104 may be of similar or different types. Examples of different types of the machines 104 may include a motor grader type, a dozer type, a hydraulic excavator type, a haul truck type, etc. In one embodiment, the machine 104 working at the worksite 108 may be controlled remotely by an operator sitting at the universal remote operator station 102. In one embodiment, the machine 104 may be in a remote control mode or an autonomous mode.

In one embodiment, the universal remote operator station 102 may be configured to provide a list of the different types of machines 104 that are capable of being operated remotely. The operator sitting at the universal remote operator station 102 may select a desired machine 104. The universal remote operator station 102 may be configured to communicate with a database to extract a number of functionalities associated with the control operations of the operator selected machine 104. In one embodiment, based on the extracted functionalities associated with the control operations of the operator selected machine 104, the universal remote operator station 102 is configured to map the extracted functionalities to a number of control devices placed within the universal remote operator station 102. Examples of the control devices may include a joystick, foot pedals, steering, etc. Therefore, the control devices in the universal remote operator station 102 may work or provide control operations required for controlling the operator selected machine 104.

The disclosure may be described herein in terms of functional block components, screen shots, optional selections and various processing steps. It should be appreciated that such functional blocks may be realized by any number of hardware and/or software components configured to perform the specified functions. Further, it should be noted that universal remote operator station 102 may employ any number of conventional techniques for data transmission, signaling, data processing, network control, and/or the like.

Figure 2:
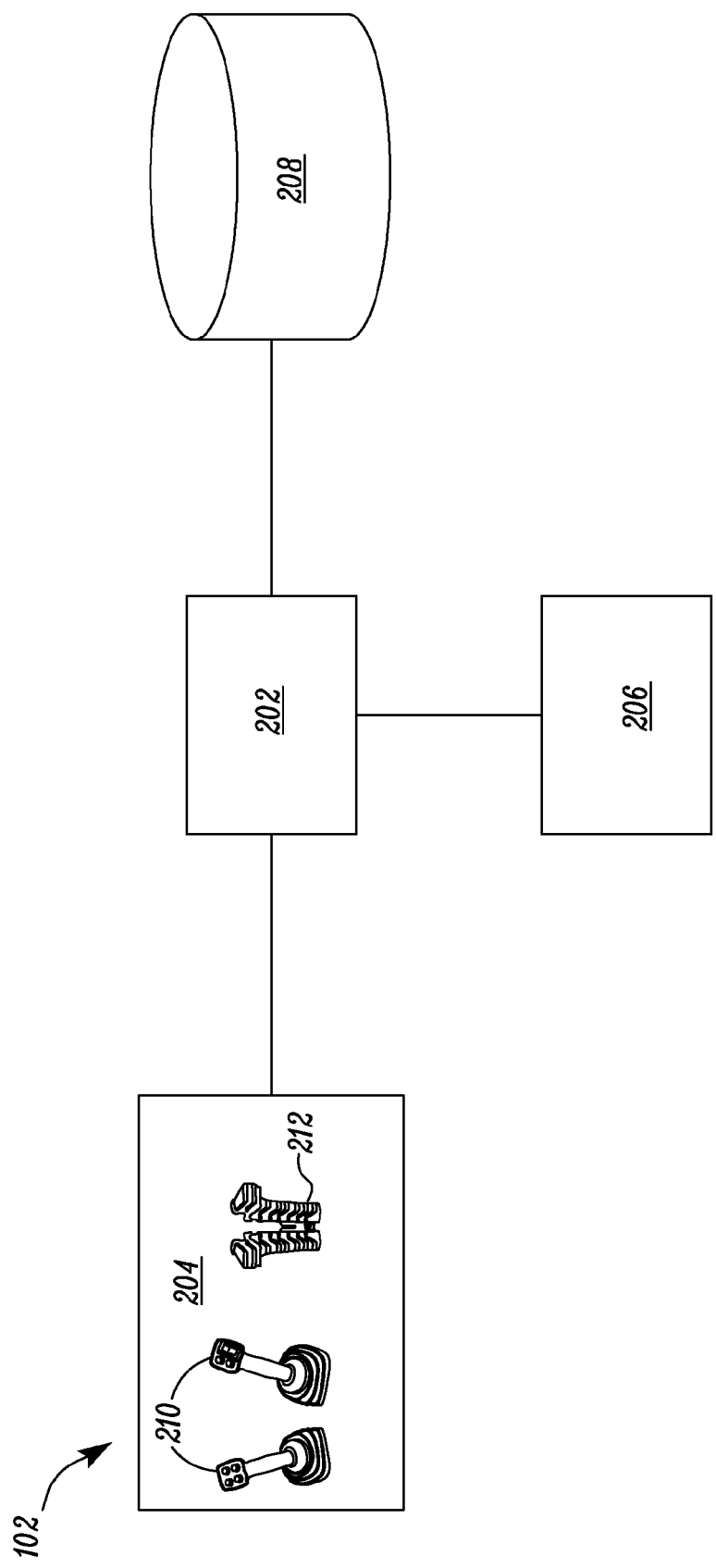
FIG. 2 is a block diagram of the universal remote operator station having a plurality of controls and a display unit.

FIG. 2 illustrates an exemplary block diagram of the universal remote operator station 102. In one embodiment, the universal remote operator station 102 is configured to control operation of a machine 104 capable of being operated remotely. As illustrated in FIG. 2, the universal remote operator station 102 may include a controller 202, a number of control devices 204, a display device 206, and a database 208. In one embodiment, the control devices 204 may include a pair of joysticks 210, a pair of pedals 212 and the like. In addition, the universal remote operator station 102 may also include an operator seat (not shown in the figures).

In one embodiment, the controller 202 is configured to extract a list of the available machines 104 within the worksite 108. For example, the controller 202 may extract the list of the available machines 104 from the database 208. The list of the available machines 104 within the worksite 108 may be populated in real time by recording the entry and exit of the machines 104 in the worksite 108 by using RFID tags or other similar identification systems. The list may be stored in the database 208 and may be updated in real time. The database 208 may be internal to the universal remote operator station 102 or external to the universal remote operator station 102. Further, the database 208 may employ any type of database, such as relational, hierarchical, graphical, object-oriented, and/or other database configurations.

The list of the available machines 104 within the work site 108 may be displayed to an operator on the display device 206. In one embodiment, the display device 206 may include a monitor such as a liquid crystal display (LCD), a light emitting diode (LED) display, a thin film transistor (TFT) display, or a cathode ray tube (CRT) display. The display device 206 may also include a touchscreen display panel to enable the operator to input or select the desired machine 104. In an alternate embodiment, the universal remote operator station 102 may include a separate input device (not shown in the figures) configured to receive inputs from the operator for selecting the machine 104. For example, the input devices may include an operator panel, a touch screen, a speaker, etc.

The operator sitting in the universal remote operator station 102 may provide an input by selecting the desired machine 104 via the touchscreen of the display device 206 or through the input device. Further, the controller 202 is configured to receive the operator input indicative of the machine 104 selected from the list of available machines 104 within the worksite 108.

In one embodiment, based on the operator selected machine 104, the controller 202 may extract a list of operational information associated with the selected machine 104. The operational information associated with the selected machine 104 may be displayed on the display device 206. For example, the operational information associated with the selected machine 104 may include speed of the machine 104, an engine warning, a transmission gear associated with the selected machine 104, and the like.

In one embodiment, the display device 206 is configured to display a graphical user interface (GUI) display including a view of the operational information of the selected machine 104. In one embodiment, the controller 202 may communicate with an electronic control module (ECM) on-board the selected machine 104 to retrieve the operational information of the machine 104 in real time in the form of feeds from the machine 104.

Further, the controller 202 is configured to determine a number of functionalities associated with the controlling or operation of the selected machine 104. Examples of the functionalities associated with the operator selected machine 104 may include steering controls, light controls, transmission controls, horn, travel speed toggle, engine speed toggle, implement control etc. In one embodiment, the controller 202 may extract the various functionalities associated with the selected machine 104 from the database 208. In one embodiment, the database 208 may include a pre-determined dataset of functionalities associated with the types of the machines 104. For example, the functionalities associated with the selected machine 104 may be based on a type of the selected machine 104. Therefore, in the various embodiments of the present disclosure, the determined functionalities would be different for different types of operator selected machine 104. For example, on selection of a dozer type machine 104, the implement control would include blade pitch control, blade tilt left, right control etc. On the other hand, in case of a hydraulic excavator type of machine 104, the implement control may include linkage controls such as boom and stick control, and bucket position control, magnet toggle etc.

The controller 202 may further map these determined functionalities associated with the operator selected machine 104 to various control devices 204 within the universal remote operator station 102. Examples of the control devices 204 placed within the universal remote operator station 102 may include a pair of joysticks 210, foot pedals 212, steering control (not shown) and the like. Based on the mapping of the functionalities to the various control devices 204, the control devices 204 are configured to perform the functionalities associated with the controlling and operations of the operator selected machine 104. Therefore, the pair of joysticks 210 in the universal remote operator station 102 may be configured to provide transmission control or implement control for the selected machine 104. Similarly, foot pedals 212 in the universal remote operator station 102 may be configured to provide speed control and braking for the selected machine 104, and so on. A person of ordinary skill in the art will appreciate that additional control devices may also be utilized. Moreover, the functionalities related to the transmission and implement control of the machine 104 described herein is merely exemplary. Other functionalities related to the selected machine 104 may also be controlled via the universal remote operator station 102.

Therefore, for a different type of operator selected machine 104, the same control devices 204 within the universal remote operator station 102 can be used to control different functionalities associated with another operator selected machine 104. In one embodiment, the controller 202 may be configured to display these mapped functionalities to the control devices 204 on the display device 206. For example, the display device 206 may be configured to display one or more GUI displays showing the functionalities of the selected machine 104 which are mapped to the control devices 204 within the universal remote operator station 102. It should be noted that the GUI may differ based on the type of machine 104 selected for operation by the operator. For example, a main screen appearance of the dozer type machine 104 may be different from that of the hydraulic excavator type machine 104. Also, subsequent GUIs displayed to the operator after the display of the main screen may also differ from one machine type to another. For example, number of GUIs displayed, appearance of the GUIs, and the like may vary based on the type of the machine 104 selected.

The operator in the universal remote operator station 102 may view the functionalities associated with the control devices 204 on the display device 206, and accordingly use the control devices 204 to further control or operate the selected machine 104 remotely working at the worksite 108.

In one embodiment, the universal remote operator station 102 may include additional display devices configured to display various video feeds from a number of image capturing devices, like overhead cameras, rear view cameras, and the like, which are installed on-board the selected machine 104 and/or the worksite 108. For example, the videos from the cameras on the machine 104 can allow the operator to view the surroundings of the selected machine 104.

Figure 3:
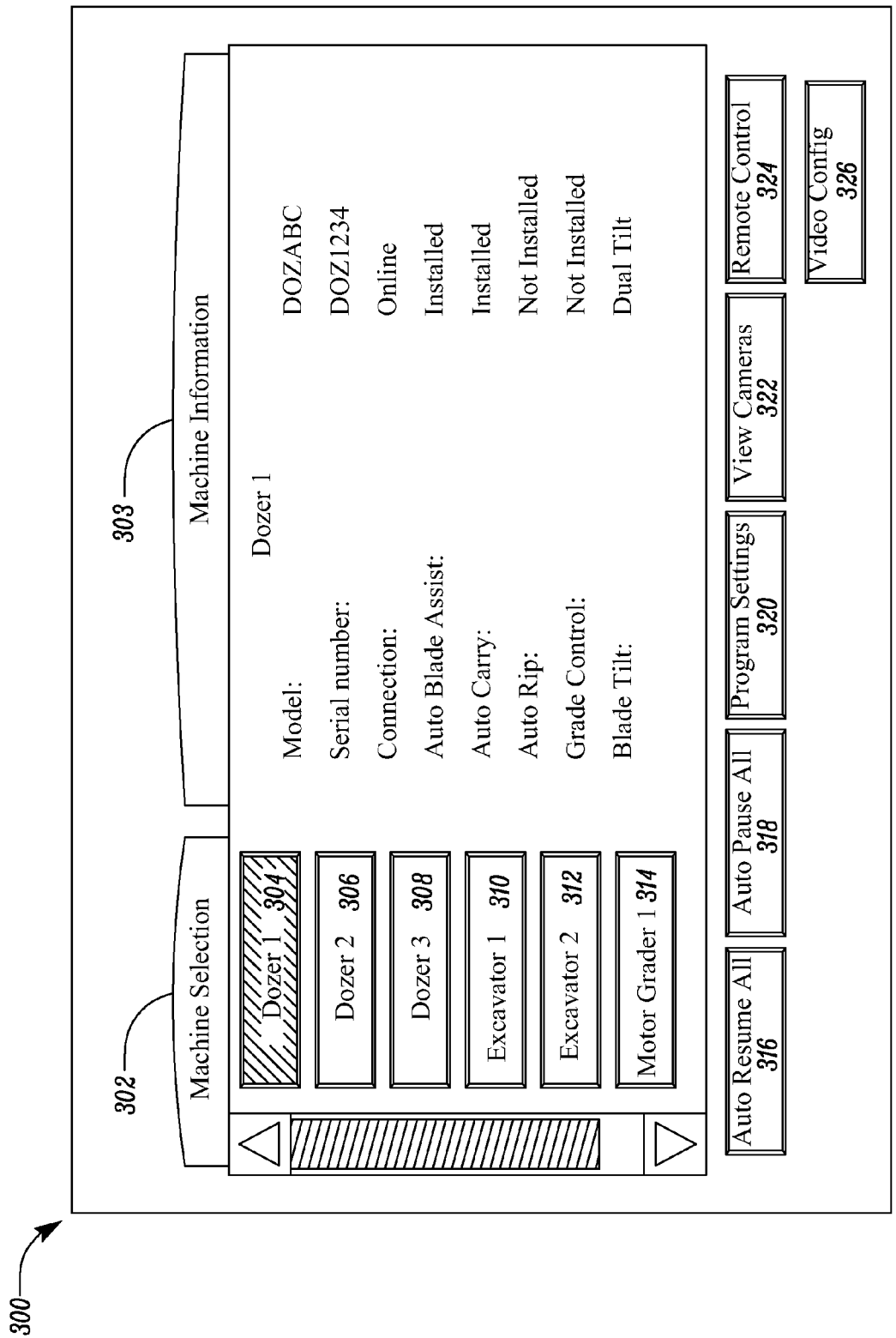
FIG. 3 illustrates an exemplary graphical user interface (GUI) display for providing a list of the types of machines available for selection for remote operation.

FIG. 3 illustrates an exemplary graphical user interface (GUI) display 300 for providing the list of available machines 104 displayed on the display device 206 of the universal remote operator station 102. As seen in FIG. 3, a list of available machines 104 such as dozer 1, dozer 2, dozer 3, excavator 1, excavator 2 and motor grader 1 are displayed in a machine selection section 302 of the window 300. As shown in the figure, the list of available machines 104 may include six different machines 104 wherein the first three machines shown in the list are dozer types such as dozer 1 (tab 304), dozer 2 (tab 306), dozer 3 (tab 308), the next two machines are hydraulic excavator types, such as excavator 1 (tab 310), excavator 2 (tab 312), and the last one is a motor grader type such as a motor grader 1 (tab 314). In an embodiment, the operator may perform a number of functions associated with a selected machine by executing a number of tabs on the GUI window 300. Examples of these tabs may include but not limited to, an "Auto Resume All" tab 316, an "Auto Pause All" tab 318, a "Program Settings" tab 320, a "View cameras" tab 322, a "Remote Control" tab 324, and a "Video Config" tab 326.

Figure 4:
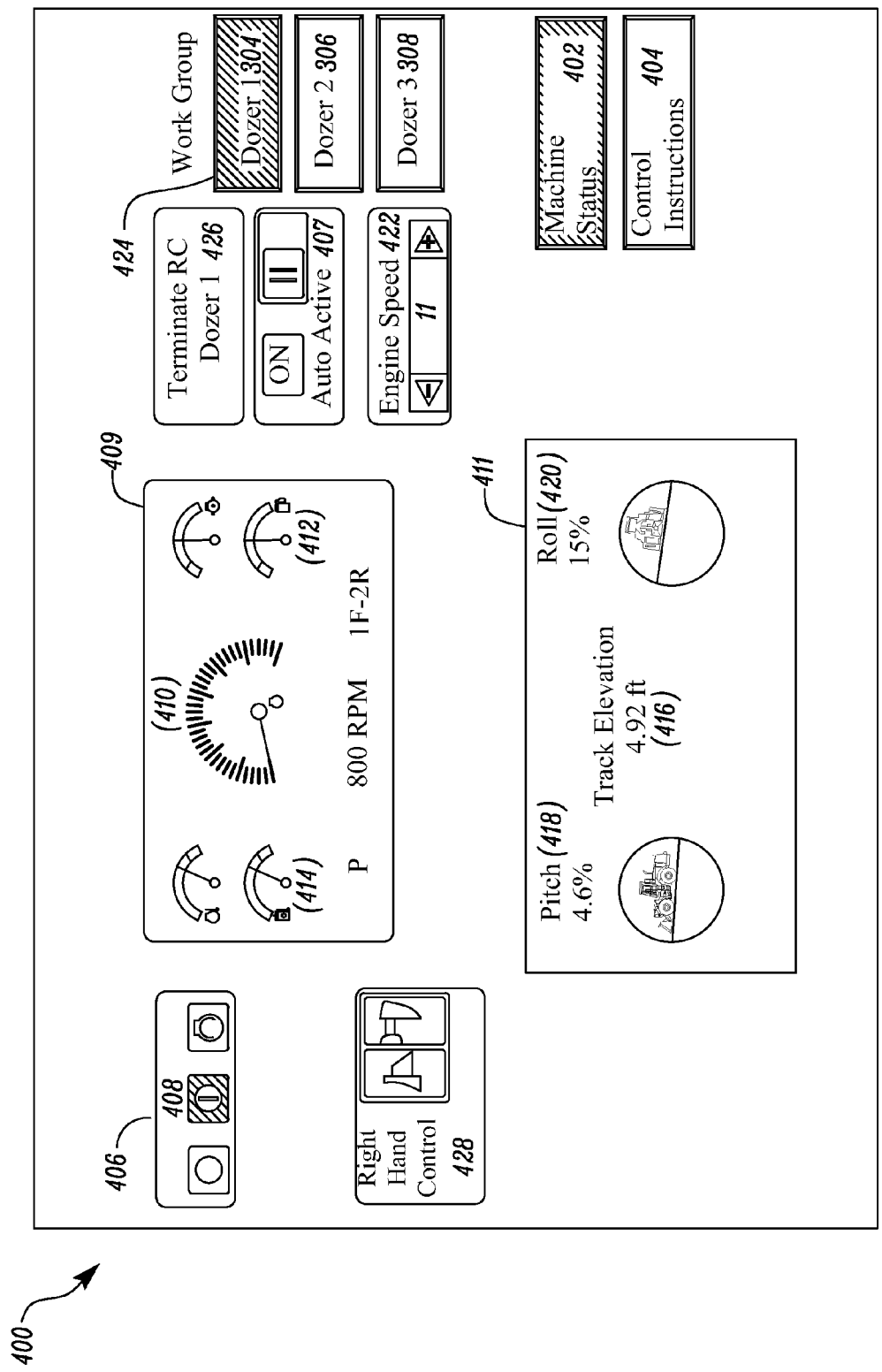
FIG. 4 illustrates an exemplary main screen GUI display on selection of a first type of machine.
Figure 5:
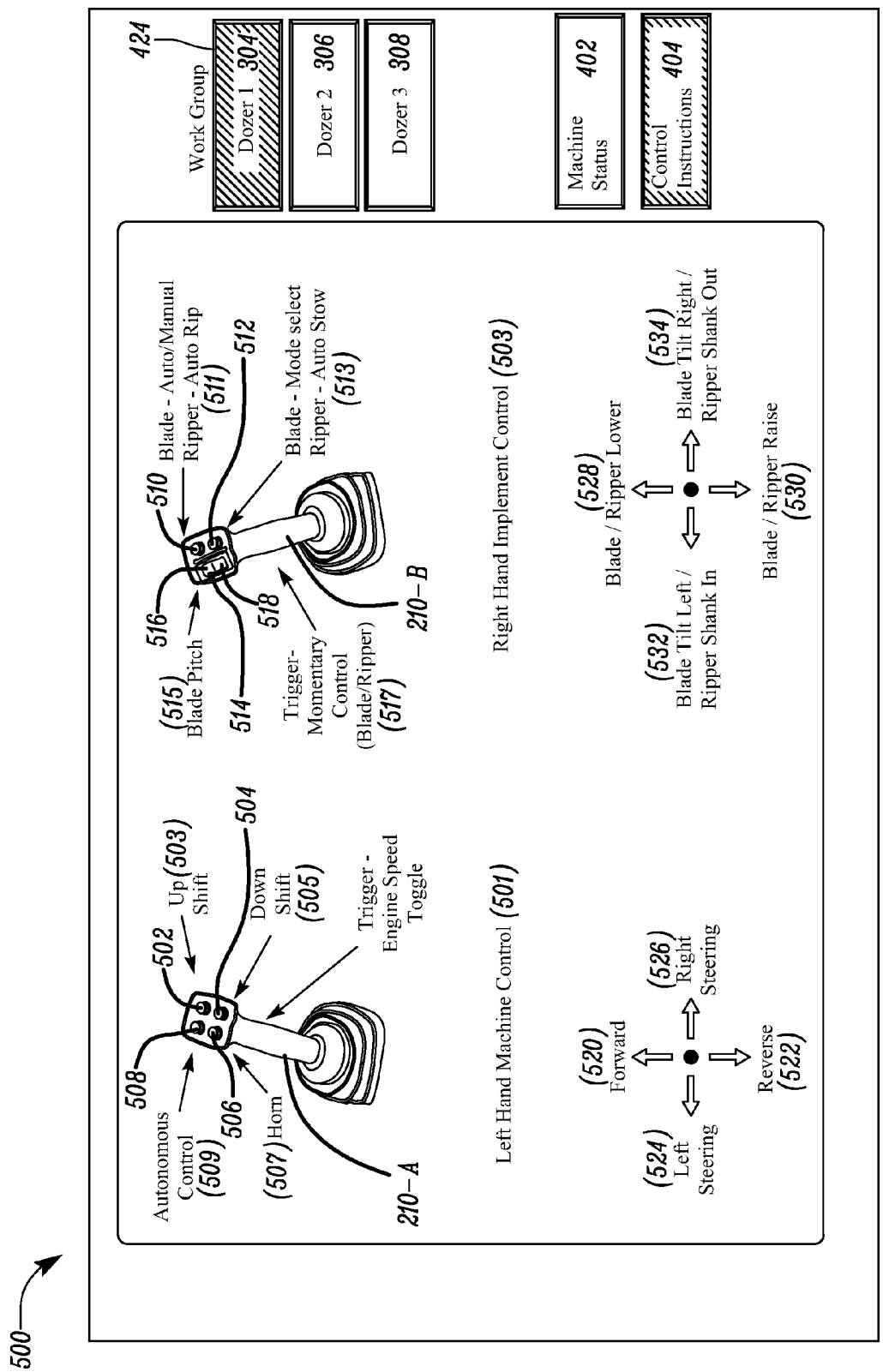
FIG. 5 illustrates an exemplary GUI display for depicting mapping of functionalities of the first type of machine to the plurality of control devices in the universal remote operator station.
Figure 6:
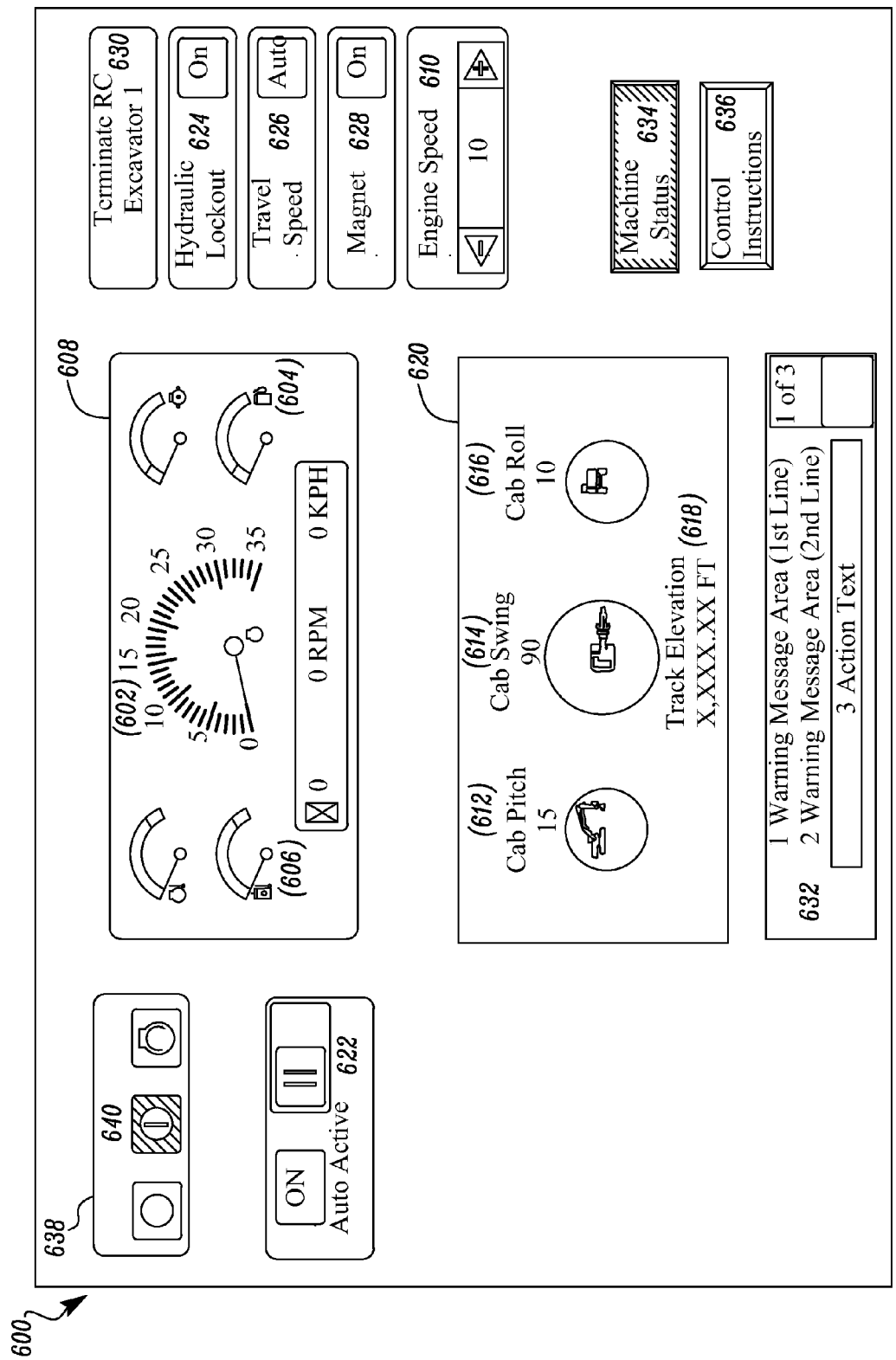
FIG. 6 illustrates an exemplary main screen GUI display on selection of a second type of machine.
Figure 7:
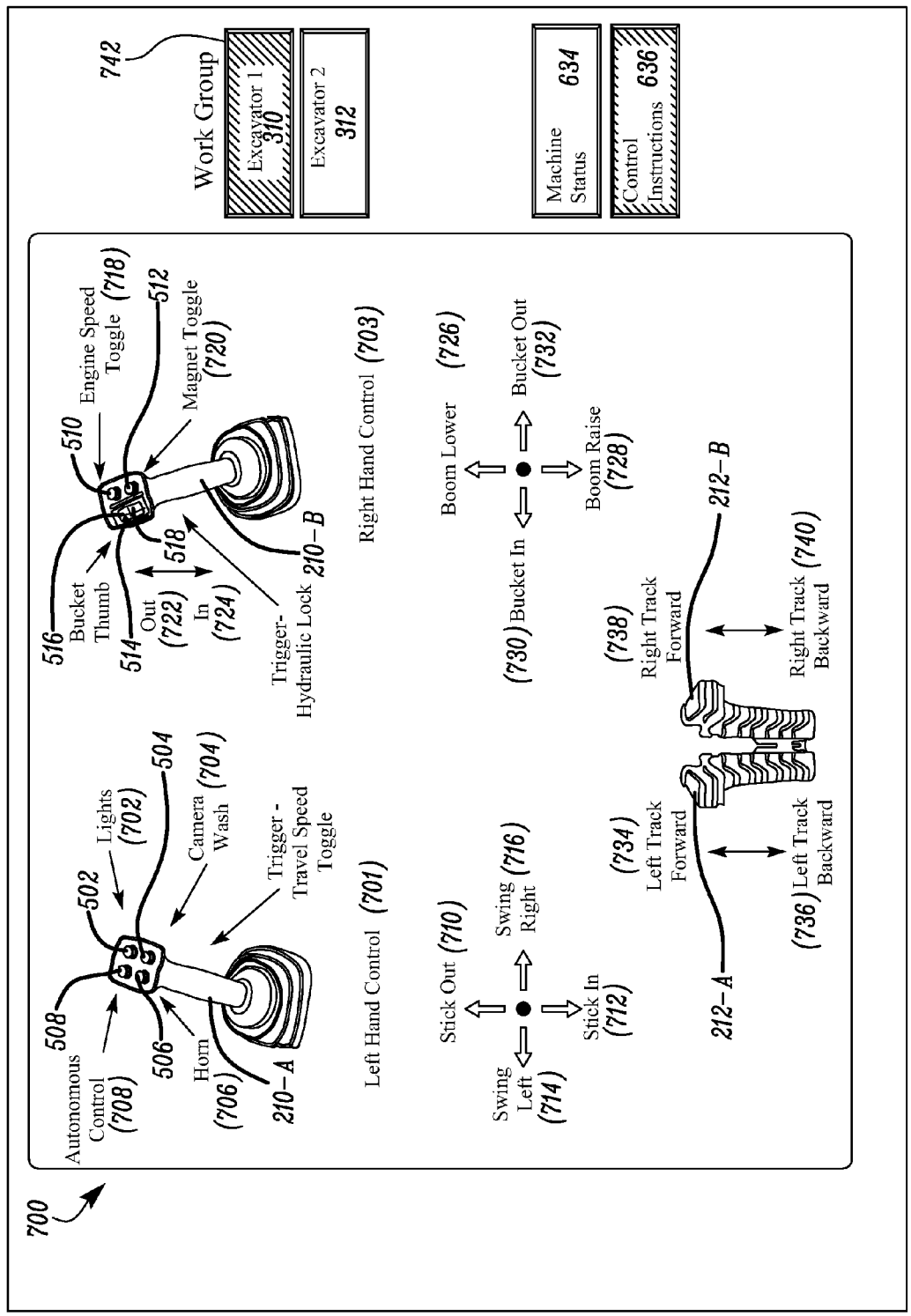
FIG. 7 illustrates an exemplary GUI display depicting mapping of functionalities of the second type of machine to the plurality of control devices in the universal remote operator station.

A person of ordinary skill in the art will appreciate that the universal remote operator station 102 can be used to operate other types of machines 104 not described herein. In one example, FIGS. 4 and 5 illustrate exemplary GUIs displayed to the operator on selection of the dozer type machine 104. In another scenario, FIGS. 6 and 7 depict exemplary GUIs displayed to the operator on selection of the hydraulic excavator type machine 104.

Based on the selection made by the operator, the controller 202 may be configured to display related information for the selected machine 104. For example, if the selected machine 104 is dozer 1, as shown in FIG. 3, then a machine information section 303 in the window 300 may display the information related to the dozer 1, such as model, serial number, connection status, blade tilt status etc., of the dozer 1. Similarly, if the selected machine 104 is an excavator type machine 104, such as excavator 1, then the machine information section 303 may display information related to the selected excavator 1. For example, the related information in section 303 in this example may include model, serial number, connection status, bucket status, and the like of the excavator 1. As seen in FIG. 3, the selected machine 104, i.e., dozer 1 in this case is shown by hashed lines.

FIG. 4 is an exemplary main screen GUI 400 which is displayed on selection of the dozer 1 (tab 304). In one embodiment, the operator may view the operational information of the selected dozer 1 by executing a "Machine Status" tab 402 displayed on the GUI window 400. As shown in the figure, section 406 shows the selected dozer 1 in a start mode by executing the "Start" tab 408. Further, the GUI window 400 includes a number of dials to indicate the various operational information of the dozer 1. Examples of the operational information of the dozer 1 may include, but not limited to, speed 410, fuel status 412, coolant status 414 of the dozer 1 as shown in section 409 of the GUI 400. The GUI window 400 may further display a track elevation status 416, pitch 418, roll 420, of the dozer 1 as shown in section 411 of the GUI 400. The operator may further view an engine speed 422 of the dozer 1, and work group 424 of the dozer 1. In an embodiment, the operator may terminate the remote control of the dozer 1 at any time by executing a "Terminate RC Dozer 1" tab 426 as shown in the GUI window 400. Further, the operator may view the right hand controls of the dozer 1 by executing the "Right Hand Control" tab 428 of the GUI window 400. In one embodiment, the operational information of dozer 1 may be received via feeds from the electronic control module (ECM) of the dozer 1. The controller 202 may communicate with the ECM of the dozer 1 via the network 106 to receive the feeds.

In a further embodiment, the operator may monitor the working of the selected dozer 1 by viewing a number of video feeds received from cameras onboard the dozer 1 and the surroundings of the dozer 1. In one embodiment, the operator may further execute an auto active mode 407 of the dozer 1 to operate the selected dozer 1 remotely. In one embodiment, based on the execution of the auto active mode 407 of the dozer 1, the control devices 204 of the universal remote operator station 102 may be mapped with functionalities associated with the controlling and operating of the dozer 1. Further, the operator may view the mapped controls of the control devices 204 by executing a "control instructions" tab 404 displayed on the GUI window 400.

In a further embodiment, the operator may remotely operate the dozer 1 via the control devices 204 in the universal remote operator station 102. Accordingly, FIG. 5 illustrates an exemplary GUI display 500 for viewing the mapped functionalities onto the control devices 204 of the universal remote operator station 102. In this case, the operator selected machine 104 is the dozer 1. In one embodiment, the controller 202 is configured to display the mapped functionalities on the display device 206 provided within the universal remote operator station 102.

As seen in FIG. 5, a first joystick 210-A may be configured to provide left hand machine control 501 for the dozer 1. In one embodiment, the joystick 210-A may include four push buttons 502, 504, 506 and 508. These push buttons may be configured to perform up shift 503 of the gear transmission, down shift 505 of the gear transmission, horn control 507 and autonomous control 509. Further, a forward movement of the joystick 210-A may move the dozer 1 in forward direction 520 and a backward movement of the joystick 210-A may move the dozer 1 in reverse direction 522. Further, the left movement of the joystick 210-A may provide left steering control 524 and the right side movement of the joystick 210-A may provide right steering control 526 of the dozer 1.

In one embodiment, a second joystick 210-B may be configured to provide right hand implement control 503 of the dozer 1. The second joystick 210-B may include two push buttons 510, 512 and a rocker switch 514 having two ends 516 and 518. As seen in the figure, for the dozer 1, the push buttons 510 and 512 may be configured to provide blade mode controls such as auto 511 or manual 513. Further, the rocker switch 514 may be configured to provide blade pitch control 515 (when the first end 516 of the switch 514 is activated) and trigger momentary control 517 (when the second end 518 of the switch 514 is activated). Further, the joystick 210-B may be configured to provide right hand implement control for the selected dozer 1. Therefore, a forward movement of the joystick 210-B may lower the blade/ripper 528, whereas the backward movement of the joystick 210-B may raise the blade/ripper 530. Furthermore, a left movement of the joystick 210-B may tilt the blade/ripper in the left direction 532 and a right movement of the joystick 210-B may tilt the blade/ripper in the right direction 534. Therefore, the control devices 204 in the universal remote operator station 102 may provide all the functionalities for controlling the selected machine 104 which is the dozer 1 in the above example.

In one embodiment, at any instant of time, the operator may switch to control of any other machine 104 on the worksite 108 by returning to the main screen, such as the main screen displayed on the GUI display 300, depicting the list of machines 104 capable of being controlled remotely.

Referring back to FIG. 3, when the operator selects the hydraulic excavator type machine 104 such as excavator 1 (tab 310) on the GUI display 300, the exemplary GUIs shown in FIGS. 6 and 7 may be displayed to the operator via the display device 206. As shown in FIG. 6 an exemplary GUI display 600 for displaying operational information about the excavator 1 is displayed. As shown in the figure, section 638 shows the selected excavator 1 in a start mode by executing the "Start" tab 640. As seen in the figure, the operational information related to the excavator 1 may include but not limited to speed 602, fuel status 604, coolant status 606, of the excavator 1 as shown in section 608 of the GUI 600. Further, a cab pitch 612, a cab swing 614, cab roll 616, track elevation 618, of the excavator 1 may be displayed to the operator as shown in section 620 of the GUI 600. In one embodiment, the operator may further execute an auto active mode 622 of the excavator 1 to operate the selected excavator 1 remotely. The GUI window 600 may further display an engine speed 610, a hydraulic lockout mode 624, a travel speed 626, a magnet status 628 for the excavator 1. Furthermore, the operator may terminate the remote controlling of the excavator 1 by executing a "Terminate RC Excavator 1" tab 630 as shown in the GUI 600. In one embodiment, based on the execution of the auto active mode 622 of the excavator 1, the control devices 204 of the universal remote operator station 102 may be mapped with functionalities associated with the controlling and operating of the excavator 1.

Furthermore, the operator may further execute the "control instructions" tab 636 displayed on the GUI display 600 to view the mapped functionalities associated with the controlling and the operating of the excavator 1 selected by the operator. FIG. 7 illustrates an exemplary GUI display 700 configured to view the functionalities particular to the excavator 1 which is mapped onto the control devices 204 within the universal remote operator station 102.

As seen in FIG. 7, the first joystick 210-A may be configured to provide left hand machine control 701 for the excavator 1. The first joystick 210-A may be configured to include the four push buttons 502, 504, 506 and 508. These push buttons 502, 504, 506 and 508 may be configured to provide lights controls 702, camera wash 704, horn control 706 and autonomous control 708, respectively. The movement of the joystick 210-A may be configured to provide stick out function 710, stick in function 712, swing left 714 and swing right 716 functions for the excavator 1 as selected by the operator, as shown in the figure.

Furthermore, the second joystick 210-B may be configured to provide right hand machine control 703 for the excavator 1. The second joystick 210-B may include the two push buttons, 510 and 512, configured to provide engine toggle speed 718 and magnet toggle 720 respectively. The joystick 210-B may further include a rocker switch 514 having two ends 516 and 518. The switch 514 is configured to provide bucket thumb out 722 and bucket thumb in 724 functions by activating the first end 516 and the second end 518 of the switch 514 respectively. In a further embodiment, the movement of the joystick 210-B may be configured to provide boom lower 726, boom raise function 728, bucket in 730 and bucket out 732 functions for the implement of the excavator 1, as shown in the figure. Furthermore, a pair of foot pedals 212-A and 212-B in the universal remote operator station 102 is configured to provide transmission controls such as left track forward 734, left track backward 736, right track forward 738, and right track backward 740 for the excavator 1. As will be appreciated that the implementation of the control devices 204 provided within the universal remote operator station 102 described herein is exemplary and does not limit the scope of the present disclosure.

The universal remote operator station 102 described herein thus allows for control of different types of machines 104 selected by the operator from a single station. As explained above, the functionalities specific to the selected type of machine 104 are accordingly mapped to the plurality of control devices 204 present in the universal remote operator station 102. Moreover, the sequence, content and number of GUIs displayed to the operator may vary based on the selected machine 104.

Industrial Applicability

Some machines are capable of being operated in a remote control or an autonomous mode. The operator may control these machines from an operator station located at a remote location. However, there are different remote operator stations for different types of machines. For example, the remote operator station may be configured to have controls specific to a single type of machine, such as, for example, a motor grader, a dozer, and the like. This approach proves to be expensive since the remote operator station provides support only for a single type of machine.

To this end, the universal remote operator station 102 is disclosed herein. The universal remote operator station 102 of the present disclosure controls the operation of the operator selected machine 104 working at the worksite 108. The universal remote operator station 102 determines a number of functionalities associated with controlling and operation of the machine 104 and maps these determined functionalities to a number of control devices 204 placed within the universal remote operator station 102. Further, the operator sitting in the universal remote operator station 102 may use the control devices 204 to control the functionalities of the selected machine 104. The universal remote operator station 102 enables remote controlling of different types of machines 104 such as a motor grader, excavator, dozer, etc., using a common set of hardware and the control devices 204 placed within the universal remote operator station 102.

Figure 8:
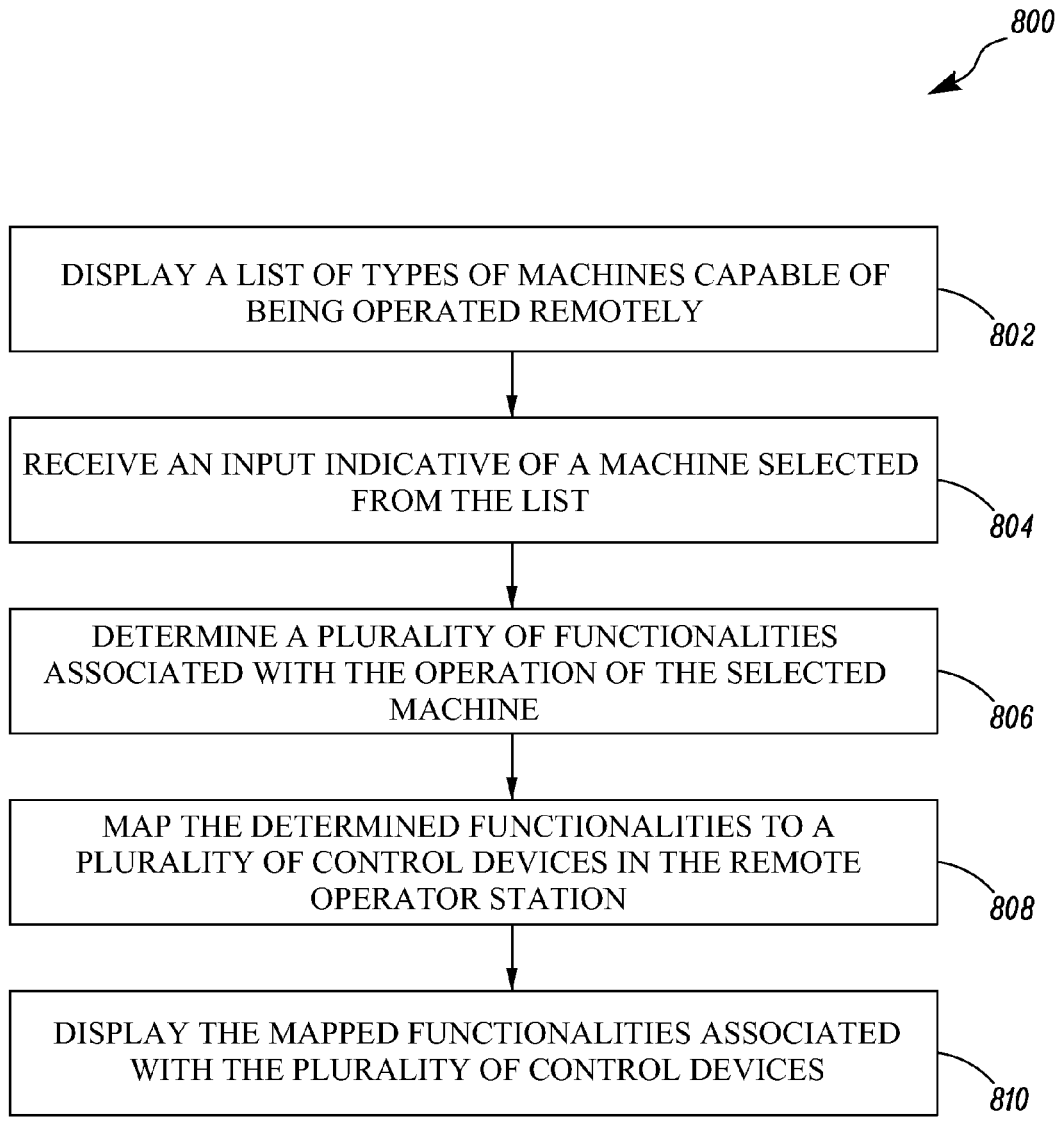
FIG. 8 is a flowchart of a method for controlling an operation of the selected machine from the universal remote operator station.

FIG. 8 illustrates a method 800 for controlling an operation of the machine 104 from the universal remote operator station 102. Initially, at step 802, the list of types of machines 104 capable of being operated remotely, is displayed. In one embodiment, the controller 202 displays the list of the types of machines 104 on the display device 206. Examples of different types of machine 104 may include a motor grader, a dozer, an excavator, a haul truck etc.

Further, at step 804, the input indicative of the machine 104 selected from the list is received. For example, the operator may select the desired machine 104 from the list displayed on the display device 206. In one embodiment, the controller 202 may be configured to receive the input indicative of the selected machine 104.

At step 806, the plurality of functionalities associated with the operations of the selected machine 104 are determined. In one embodiment, the controller 202 is configured to extract the functionalities associated with the operation of the selected machine 104, from the database 208. The functionalities associated with the selected machine 104 may be based on the type of the machine 104. For example, the functionalities can be based on whether the selected machine 104 is motor grader type machine, dozer type machine, an excavator type machine etc.

Additionally, the operational information associated with the selected machine 104 may be determined. In one embodiment, the controller 202 may receive feeds in real time from the selected machine 104 over the network 106. Examples of the operational information may include speed of the machine 104, engine speed, an engine warning, a transmission gear associated with the selected machine 104, etc.

Further, at step 808, the determined functionalities are mapped to the plurality of control devices 204 of the universal remote operator station 102. Examples of the control devices 204 may include the pair of joysticks 210, the foot pedals 212, etc. Based on the mapping of the functionalities to the various control devices 204, the control devices 204 are configured to perform the functionalities associated with the controlling and/or operations of the operator selected machine 104.

At step 810, the functionalities mapped to the plurality of control devices 204 are displayed to the operator. In one embodiment, the controller 202 is configured to display the mapped functionalities of the control devices 204 onto the display device 206. The operator may view the displayed mapped functionalities in order to operate the control devices 204 for controlling the selected machine 104 remotely.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A remote operator station for controlling an operation of a machine, the remote operator station comprising:
   a display device;
   a plurality of control devices; and a controller communicably coupled to the display device and the plurality of control devices, the controller configured to:
  display a list of types of machines capable of being operated remotely;
  receive an input indicative of a machine selected from the list;
  determine a plurality of functionalities associated with the operation of the selected machine;
  map the determined functionalities to the plurality of control devices; and
  display the mapped functionalities associated with the plurality of control devices on one or more graphical user interfaces, wherein the graphical user interfaces differ based on the type of machine selected.

2. The remote operator station of claim 1, wherein the plurality of control devices further includes a foot pedal and a joystick.

3. The remote operator station of claim 1, wherein the plurality of functionalities further comprises steering controls and implement controls of the machine.

4. The remote operator station of claim 1, wherein the display device includes at least one of a touchscreen and a monitor.

5. The remote operator station of claim 1 further comprising an input device communicably coupled to the display device and the controller, the input device configured to accept from an operator the input indicative of the selected machine.

6. The remote operator station of claim 1, wherein the machine includes at least one of a motor grader, a dozer, an excavator, and a haul truck.

7. The remote operator station of claim 1, wherein the controller is configured to control the operation of the selected machine based on the mapped functionalities associated with the plurality of control devices.

8. The remote operator station of claim 1, wherein the controller is configured to receive a feed from the selected machine indicative of operational information associated with the selected machine.

9. The remote operator station of claim 8, wherein the operational information includes at least one of a machine speed, an engine warning, and a transmission gear associated with the selected machine.

10. The remote operator station of claim 1, wherein the plurality of functionalities associated with the operation of the selected machine is based on the type of the selected machine.

11. The remote operator station of claim 1, wherein the controller is configured to map the determined functionalities to the plurality of control devices based on the type of the selected machine.

12. The remote operator station of claim 1, wherein the controller is configured to lookup a pre-determined dataset including one or more functionalities corresponding to the types of machines for determining the plurality of functionalities associated with the selected machine.

13. A method for controlling an operation of a machine from a remote operator station, the method comprising:
  displaying a list of types of machines capable of being operated remotely;
  receiving an input indicative of a machine selected from the list;
  determining a plurality of functionalities associated with the operation of the selected machine;
  mapping the determined functionalities to a plurality of control devices in the remote operator station; and
  displaying the mapped functionalities associated with the plurality of control devices on one or more graphical user interfaces, wherein the graphical user interfaces differ based on the type of machine selected.

14. The method of claim 13 further comprising controlling the operation of the selected machine based on the mapped functionalities associated with the plurality of control devices.

15. The method of claim 13 further comprising receiving a feed from the selected machine indicative of operational information associated with the selected machine.

16. The method of claim 15, wherein the operational information includes at least one of a machine speed, an engine warning, and a transmission gear associated with the selected machine.

17. The method of claim 13, wherein the plurality of functionalities associated with the operation of the selected machine is based on the type of the selected machine.

18. The method of claim 13, wherein mapping the determined functionalities to the plurality of control devices is based on the type of the selected machine.

19. The method of claim 13, wherein determining the plurality of functionalities further comprises looking-up of a pre-determined dataset including one or more functionalities corresponding to the types of machines.

20. A system comprising:
  one or more machines located on a worksite, the one or more machines capable of operation in at least one of a remote control or an autonomous mode, each of the one or more machines belonging to a type of machine; and
  a remote operator station in communication with the one or more machines, the remote operator station configured to control an operation of the one or more machines, the remote operator station comprising:
    a display device;
    a plurality of control devices; and
    a controller communicably coupled to the display device and the plurality of control devices, the controller configured to:
      display a list of types of machines capable of being operated remotely;
      receive an input indicative of a machine selected from the list;
      determine a plurality of functionalities associated with the operation of the selected machine;
      map the determined functionalities to the plurality of control devices;
      display the mapped functionalities associated with the plurality of control devices on one or more graphical user interfaces, wherein the graphical user interfaces differ based on the type of machine selected; and
      control the operation of the selected machine based on the mapped functionalities associated with the plurality of control devices.

* * * * *